United States Patent [19]
Kawashima et al.

[11] Patent Number: 6,005,687
[45] Date of Patent: Dec. 21, 1999

[54] IMAGING APPARATUS HAVING DIFFERENT MOTORS FOR SEPARATING AND READING DOCUMENTS

[75] Inventors: Yasuhiro Kawashima, Atsugi; Shuji Tanaka, Oiso-machi, both of Japan

[73] Assignee: Ricoh Company, Ltd., Tokyo, Japan

[21] Appl. No.: 08/893,711

[22] Filed: Jul. 11, 1997

Related U.S. Application Data

[63] Continuation-in-part of application No. 08/843,277, Apr. 14, 1997.

[30] Foreign Application Priority Data

| Apr. 12, 1996 | [JP] | Japan | 8-114397 |
| Jul. 5, 1996 | [JP] | Japan | 8-194164 |
| Jul. 12, 1996 | [JP] | Japan | 8-183697 |

[51] Int. Cl.$^6$ .............................. H04N 1/04; B65H 5/00; B65H 5/34
[52] U.S. Cl. .................. 358/498; 358/496; 271/10.11; 271/270
[58] Field of Search ............... 358/296, 400, 358/401, 409, 412, 474, 496, 497, 498; 355/50; 399/365, 367; 271/10.01, 10.09, 10.11, 270, 10.03

[56] References Cited

U.S. PATENT DOCUMENTS

| 3,602,639 | 8/1971 | Alden | 358/474 |
| 4,774,591 | 9/1988 | Matsunawa et al. | 358/498 |
| 4,928,151 | 5/1990 | Saeki | 399/374 |
| 5,401,012 | 3/1995 | Taruki | 271/10.01 |
| 5,497,250 | 3/1996 | Kawashima . | |
| 5,645,273 | 7/1997 | Nakagawa et al. | 271/10.03 |

*Primary Examiner*—Kimberly A. Williams
*Attorney, Agent, or Firm*—Oblon, Spivak, McClelland, Maier & Neustadt, P.C.

[57] ABSTRACT

An imaging device of the present invention includes a separating unit for separating a stack of original documents one by one. The separating unit feeds the separated document to a reading unit capable of reading an image out of the document. To insure stable operation of both the separating unit and reading unit, the separating unit and reading unit are respectively provided with an exclusive separating motor and an exclusive reading motor. A first transporting roller is included in the separating unit and rotated at a speed equal to or higher than the rotation speed of a second transporting roller included in the reading unit. This insures stable transport of the document from the separating unit to the reading unit. Even when any drive element included in the separating unit fluctuates, drive elements included in the reading unit are free from the influence of the fluctuation.

31 Claims, 9 Drawing Sheets

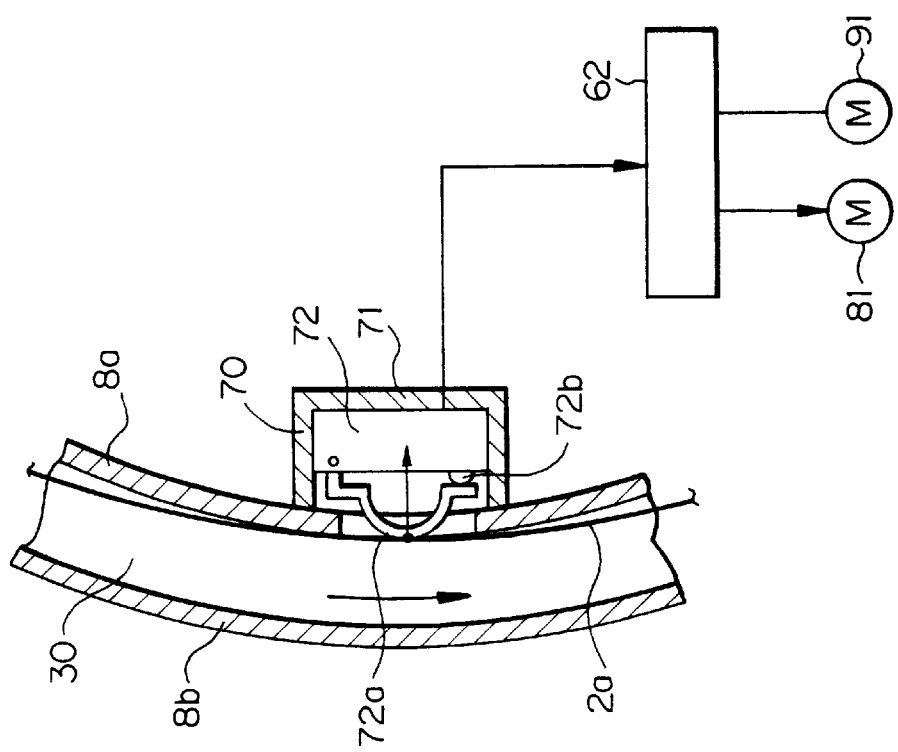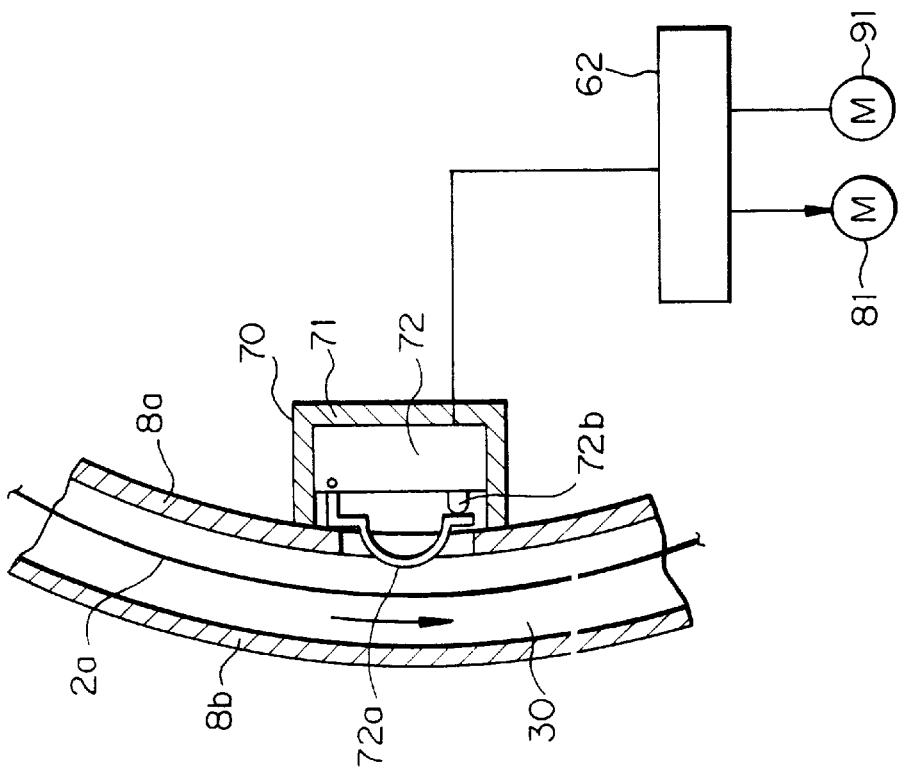

IMAGING APPARATUS HAVING DIFFERENT MOTORS FOR SEPARATING AND READING DOCUMENTS

CROSS REFERENCE TO RELATED APPLICATION

This application is a continuation-in-part of copending U.S. application Ser. No. 08/843,277, filed Apr. 14, 1997.

BACKGROUND OF THE INVENTION

1. Field of the Invention

The present invention relates to an imaging device for use in a facsimile apparatus or similar image forming apparatus and, more particularly, to an imaging device including a separating unit and a reading unit.

2. Discussion of the Background

An imaging device for reading an original document is disclosed in, e.g., Japanese Laid-Open Patent Publication No. 1-271330. The imaging device disclosed in this publication includes a separating unit and a reading unit. In the separating unit, documents stacked on a document table are sequentially separated one by one. The separated document is conveyed to the reading unit, read thereby, and then driven out.

In the above imaging device, both the operation of the separating unit and that of the reading unit are controlled by a single motor. The document to be read is transported at a preselected speed based on a resolution available with a sensor included in the reading unit. The transport of the document is stopped if the capacity of a memory for storing image data during document reading is exceeded.

For these reasons, a stepping motor is used as the motor for controlling both the separating unit and reading unit. In a typical stepping motor for use in the imaging device, which may be of two-phase hybrid type, torque begins to decrease at about 2,000 pps (pulse per second) to 3,000 pps, and the maximum speed is 3,500 pps.

To meet the increasing demand for a higher document reading speed, the stepping motor must be driven by a large current and a heavy torque. This, however, results in an increase in vibration, noise and heat generated by the stepping motor.

In the separating unit, a driving load of a transporting roller is larger than a driving load of a separating roller. As a result, a load fluctuation occurs when the original document is separated from the separation roller. It is likely that such a load fluctuation is transmitted to the output shaft of the stepping motor, causing the rotation of the motor to be irregular. In the imaging device including a single stepping motor, the load fluctuation of the separating unit is transferred even to rollers built in the reading unit, preventing the reading unit from reading image data correctly.

SUMMARY OF THE INVENTION

It is therefore an object of the present invention to provide a new imaging device capable of solving the problems discussed above.

Another object of the present invention to provide a new imaging device in which a reading unit is capable of reading image data out of an original document correctly.

Still another object of the present invention to provide a new imaging device capable of reducing vibration, noise and heat generated by a motor controlling a reading unit and a separating unit.

A further object of the present invention to provide a new imaging device capable of insuring accurate document transfer from a separating unit to a reading unit.

In accordance with the present invention, an imaging device for reading an image out of an original document has a separating unit for separating a stack of original documents one by one, a separating motor for driving the separating unit, a reading unit for reading an image of the original document separated from the stack, and a reading motor for driving the reading unit.

Also, in accordance with the present invention, an imaging device for reading an image out of an original document includes a first drive motor. A first transporting section is arranged on a first transport path for transporting the original document with a torque transferred from the first drive motor. A second transporting section is arranged on a second transport path for transporting the original document with a torque transferred from a second drive motor. A curved intermediate transport path connects the first transport path to the second transport path for guiding the original document coming out of the first transport path to the second transport path. A reading unit scans the image surface of the original document being conveyed along the second transport path by the second transporting section to thereby read an image. A loop detector detects a change in the radius of curvature of the original document, as measured in the intermediate transport path, being conveyed by the first transporting section at its trailing edge and by the second transporting means at its leading edge. A controller varies, when the loop detector determines that the radius of curvature of the original document has reached a limit value defined by the intermediate transport path, the rotation speed of either the first drive motor or the second drive motor in order to confine the radius of curvature in a range defined by the intermediate transport path.

BRIEF DESCRIPTION OF THE DRAWINGS

The above and other objects, features and advantages of the present invention will become apparent from the following detailed description taken with the accompanying drawings in which:

FIGS. 7A and 7B demonstrate a specific construction and operation of a loop detector included in the third embodiment.

DESCRIPTION OF THE PREFERRED EMBODIMENTS

Preferred embodiments of an imaging device in accordance with the present invention will be described with

1st Embodiment

Figure 1:
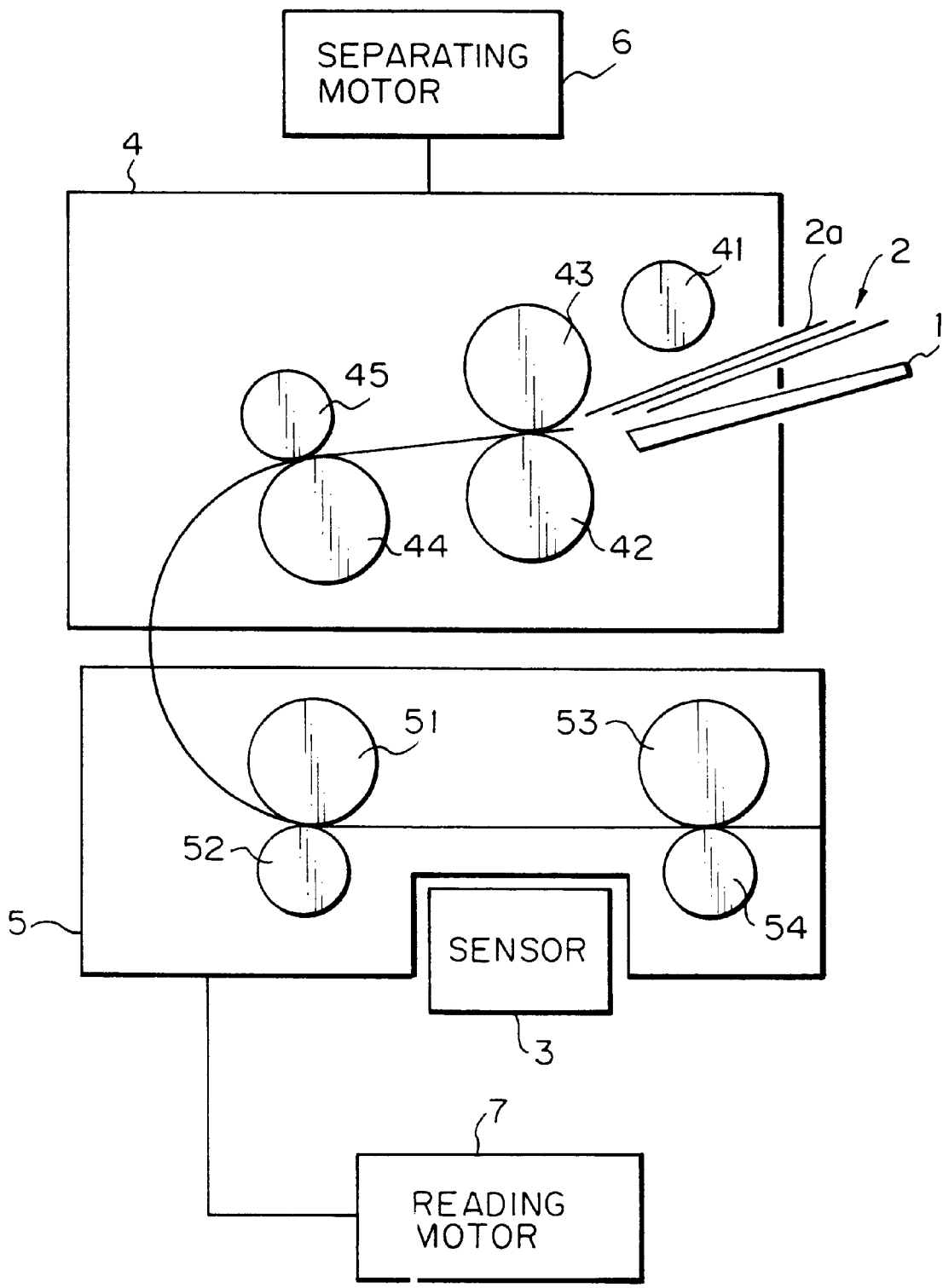
FIG. 1 shows a first embodiment of the imaging device in accordance with the present invention.

Referring to FIG. 1 of the drawings, an imaging device embodying the present invention is shown. As shown, the imaging device is generally made up of a separating unit 4 and a reading unit 5. The separating unit 4 includes a document table 1 and a separating motor 6. The reading unit 5 includes a CCD (Charge Coupled Device) or similar sensor 3 for reading an original document 2, and a reading motor 7.

The separating unit 4 further includes a pick-up roller 41, a separating roller 42, a feeding roller 43, a first transporting roller 44, and a first pressing roller 45. The pick-up roller 41 picks up the uppermost one 2a of original documents 2 stacked on the table 1. The separating roller 42 cooperates with the pick-up roller 41 to separate the uppermost document 2a from the underlying documents 2. The feeding roller 43 faces the separating roller 42 and feeds the document 2a to the first transporting roller 44 and first pressing roller 45. The transporting roller 44 transports the document 2a to the reading unit 5. The pressing roller 45 faces the transporting roller 44 and presses the document 2a against the roller 44.

The reading unit 5 includes a second transporting roller 51, a second pressing roller 52, a third transporting roller 53, and a third pressing roller 54. The second transporting roller 51 transports the document 2a transferred from the separating unit 4 toward the sensor 3 at a preselected speed based on a resolution available with the sensor 3. The second pressing roller 52 faces the transporting roller 51 and presses the document 2a against the roller 51. The third transporting roller 53 drives the document 2a out of the reading unit 5. The third pressing roller 54 faces the transporting roller 53 and presses the document 2a against the roller 53.

The output torque of the separating motor 6 is transmitted to the pick-up roller 41, separating roller 42, feeding roller 43, transporting roller 44 and pressing roller 45 included in the separating unit 4 via timing belts and gears, not shown. Likewise, the output torque of the reading motor 7 is transmitted to the transporting roller 51, pressing roller 52, transporting roller 53 and pressing roller 54 included in the reading unit 5 via timing belts and gears, not shown. In this configuration, the elements of the separating unit 4 and those of the reading unit 5 each is driven by the respective motor 6 or 7.

Figure 2A:
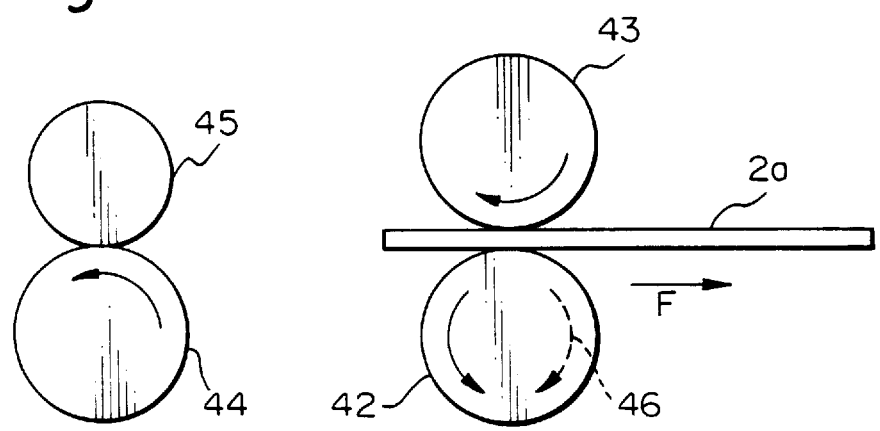
FIGS. 2A–2C demonstrate how a load fluctuates in the separating unit included in the first embodiment.
Figure 2B:
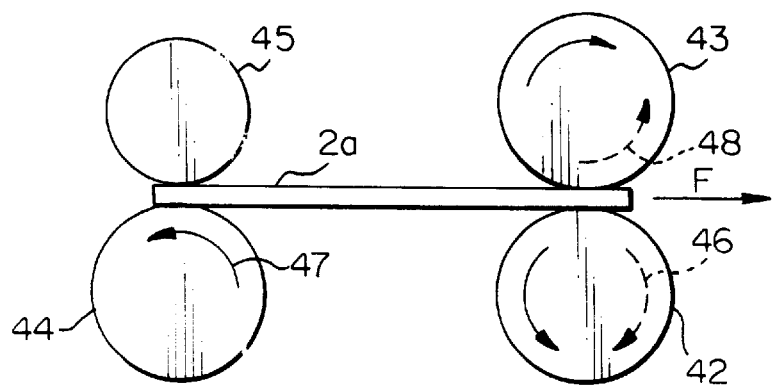
Figure 2C:
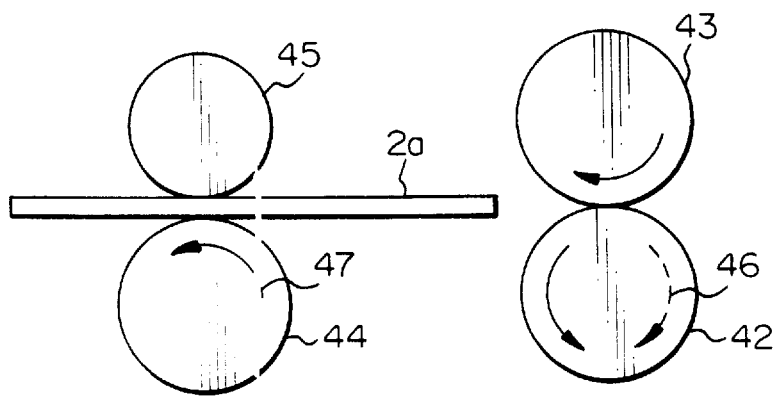

Reference will be made to FIGS. 2A–2C for describing how a load fluctuates in the separating unit 4. As shown in FIG. 2A, the uppermost document 2a is fed out from the table 1 to the separating roller 42 and feeding roller 43 by the pick-up roller 41. When the leading edge portion of the document 2a is nipped by the separating roller 42 and the feeding roller 43, it is subjected to a counter rotating force 46 ascribable to the rotation of the separating roller 42. As a result, a force F tending to pull back the document 2a is generated.

Specifically, the separating roller 42 generally rotates on the basis of friction acting between it and the feeding roller 43 and document 2a, as well known in the art. The clockwise rotation of the separating roller 42 is eliminated typically by use of a torque limiter. However, slippage is apt to occur between the separating roller 42 and the feeding roller 43 or between the separating roller 42 or feeding roller 43 and the document 2a when, e.g., two or more documents 2 are fed together, as also well known in the art. The slippage results in the counter rotating force 46. While the feeding roller 43 conveys the document 2a, the counter rotating force 46 turns out the force F and acts on the feeding roller 43.

As shown in FIG. 2B, the leading edge portion of the document 2a reaches a point between the first transporting roller 44 and the first pressing roller 45. At this time, the trailing edge portion of the document 2a is still nipped by the separating roller 42 and feeding roller 43. In this condition, the force F tends to pull back the transporting roller 44 toward the separating roller 42.

Specifically, the transporting roller 44 typically rotates at a slightly higher speed than the separating roller 42 in order to prevent the document 2 fed after the document 2a from contacting the document 2a, as well known in the art. The difference in speed between the rollers 42 and 44 is apt to result in the force F shown in FIG. 2B. The force F increases a driving load or torque 47 necessary for the transporting roller 43. At this instant, the rotation speed of the feeding roller 43 is also lower than the rotation speed of the transporting roller 44. As a result, the feeding roller 43 is driven by the transporting roller 44 with substantially no driving load 48 acting thereon.

As shown in FIG. 2C, when the trailing edge portion of the document 2a moves away from the separating roller 42 and feeding roller 43, the driving load 47 acting on the first transporting roller 44 decreases. At this instant, the feeding roller 43 is still subjected to the counter rotating force 46 ascribable to the separating roller 42. As a result, a noticeable load fluctuation occurs in each of the separating roller 42, feeding roller 43, transporting roller 44, and pressing roller 45. Such large load fluctuations are apt to adversely effect the separating motor 6. Should both the separating unit 4 and reading unit 5 be driven by a single motor, the above load fluctuations would adversely effect the motor control and therefore the reading operation of the reading unit 5.

In the illustrative embodiment the load fluctuations of the separating unit 4 are not transmitted to the reading unit 5 because the reading unit 5 has its own reading motor 7. It follows that the document 2a can be transported at a preselected speed based on the resolution of the sensor 3 without being adversely effected by the load fluctuations of the separating unit 4. Image data read can therefore be accurately read out of the document 2a by the reading unit 5.

Figure 3:
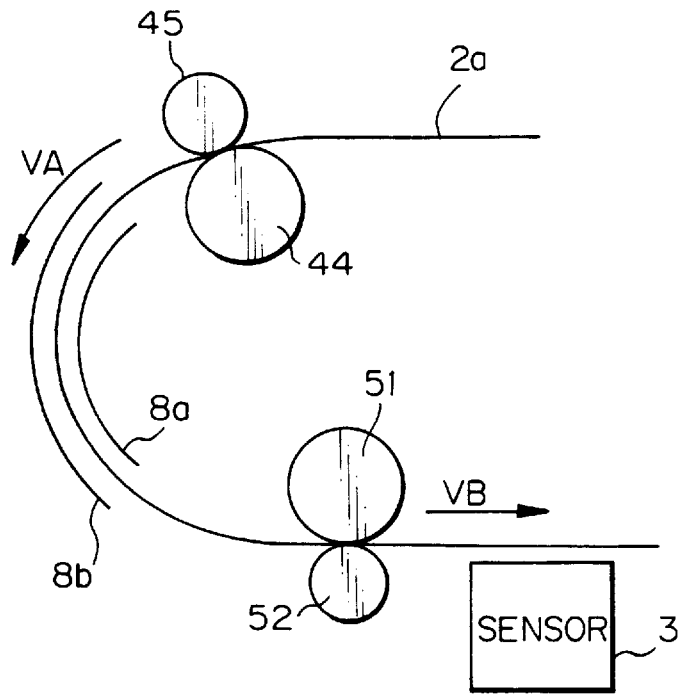
FIG. 3 shows how a load fluctuates in the reading unit included in the first embodiment.

As shown in FIG. 3, assume that the periphery of the first transporting roller 44 of the separating unit 4 moves at a speed of VA, and that the periphery of the second transporting roller 51 of the reading unit 5 moves at a speed of VB. Then, if the speed VA, is lower than the speed VB, the document 2a is tightly pulled between the two rollers 44 and 51 and caused to contact an inner guide plate 8a. The resulting friction between the document 2a and the inner guide plate 8a increases the driving load of the transporting roller 51. Further, when the trailing edge portion of the document 2a moves away from the transporting roller 44, the driving load ascribable to the transporting roller 44 does not act on the transporting roller 51. Consequently, a large load fluctuation occurs in the transporting roller 51. This is apt to prevent the document 2a from being read correctly or prevent the reading motor 7 from functioning properly. There is also shown in FIG. 3 an outer guide plate 8b facing the inner guide plate 8a.

In order to solve the above problem, in the illustrative embodiment, the rotation speed VA of the transporting roller 44 is selected to be equal to or higher than the rotation speed VB of the transporting roller 51. At least two different methods are available for making the rotation speed VA equal to or higher than the rotation speed VB, as follows. A first method is to cause each of the separating motor 6 and reading motor 7 to drive the respective transporting roller 44 or 51 at a particular speed. A second method is to provide the transporting roller 44 with an outside diameter slightly greater than the outside diameter of the transporting roller 51 while using the separating motor 6 identical with the reading motor 7.

Preferably, the rotation speed VA should be only slightly higher than the rotation speed VB. In the illustrative embodiment, the rotation speed VA is selected to be up to 1% higher than the rotation speed VB. Should the rotation speed VA be noticeably higher than the rotation speed VB, the document 2a would ripple on contacting the outer guide plate 8b.

2nd Embodiment

Figure 4:
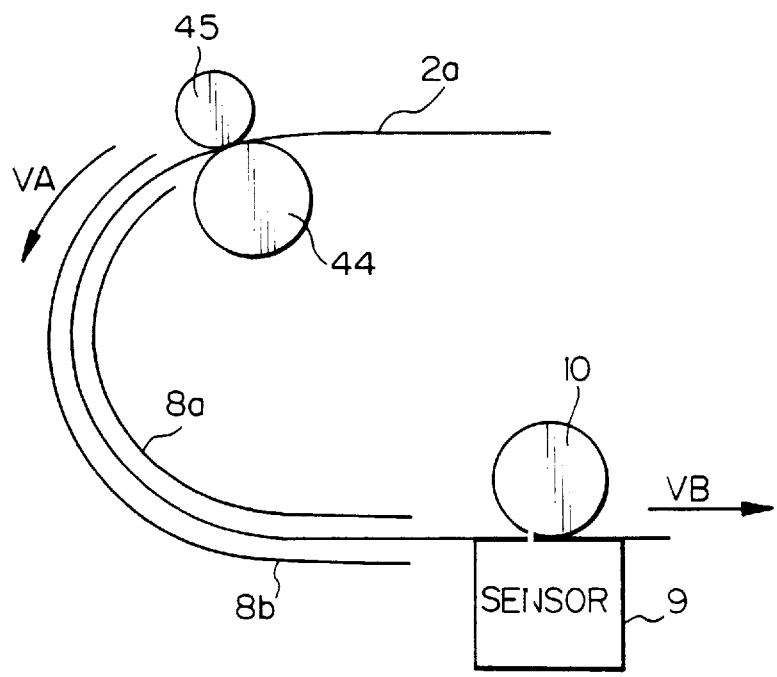
FIG. 4 shows a second embodiment of the present invention and demonstrates how a load fluctuates in a reading unit thereof.

An alternative embodiment of the present invention will be described with reference to FIG. 4. As shown, the reading unit 5 includes a contact type sensor 9 and a platen roller 10 in place of the second transporting roller 51, second pressing roller 52 and sensor 3 of the previous embodiment. The platen roller 10 transports the document 2a at a preselected speed based on the resolution of the contact type sensor 9. Again, the first transporting roller 44 may be rotated at the speed VA equal to or slightly higher than the rotation speed VB of the platen roller 10 in order to achieve the same advantages as the first embodiment.

3rd Embodiment

Figure 5:
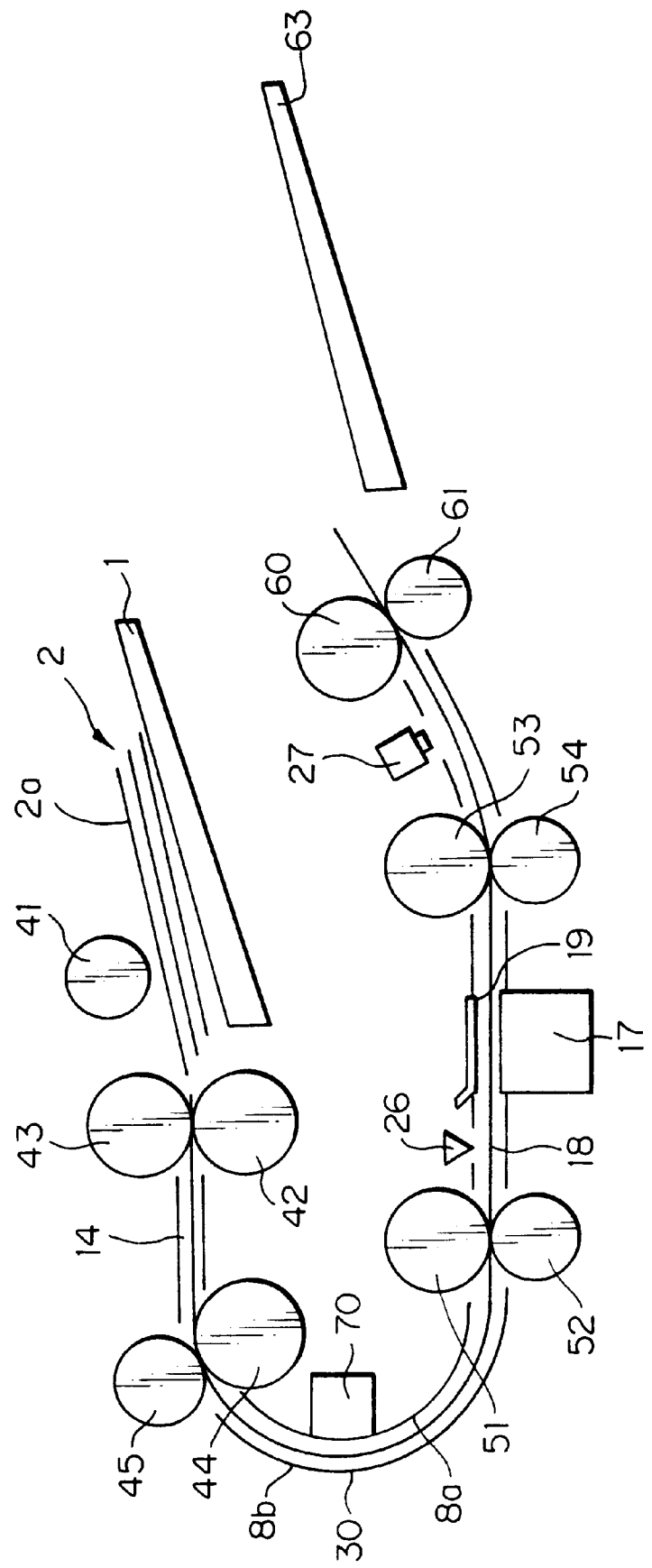
FIG. 5 shows a third embodiment of the present invention.
Figure 6:
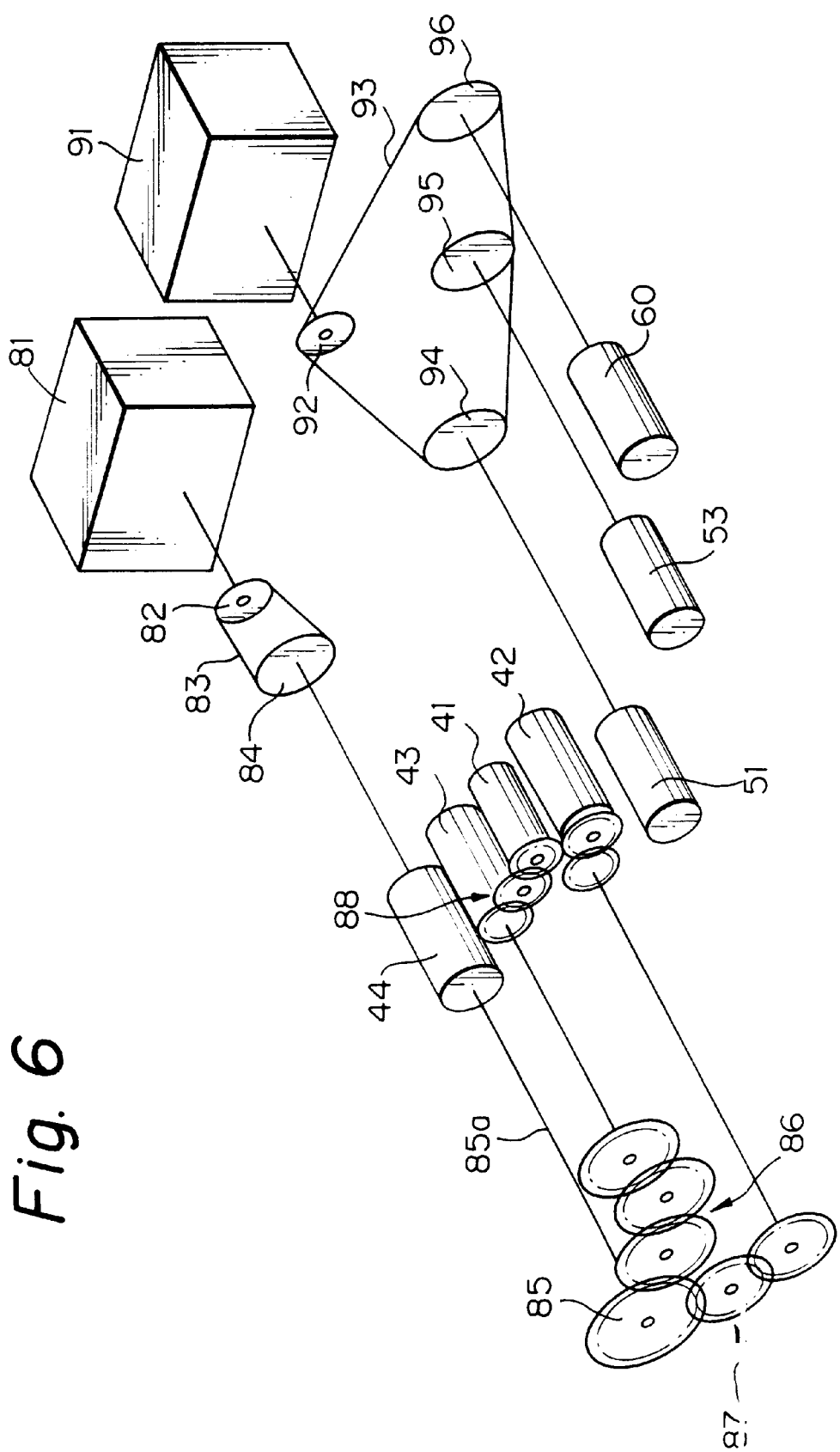
FIG. 6 is a perspective view of a transporting mechanism included in the third embodiment.

FIGS. 5 and 6 show another alternative embodiment of the present invention. As shown in FIG. 5, the pick-up roller 41 is pressed against the document stack 2 set on the document table 1. The separating roller 42 and feeding roller 43 facing each other are located at the inlet of a first transport path 14. The transporting roller 44 and pressing roller 44 and 45 facing each other are located on the transport path 14. The rollers 42, 43, 44 and 45 constitute first transporting means for transporting the document 2a along the transport path 14.

A scanner section or reading means 17 is located on a second transport path 18. A white reference plate 19 faces the scanner section 17. A transporting roller 51 and a pressing roller 52 are pressed against each other on the transport path 18 upstream of the scanner section 17. A transporting roller 53 and a pressing roller 54 are pressed against each other on the transport path 18 downstream of the scanner section 17. A discharging roller 60 and a pressing roller 61 are pressed against each other and located at the outlet of the transport path 18. The reference numeral 63 designates a tray for receiving the document 2a driven out of the transport path 18 by the rollers 60 and 61. The rollers 51–54, 60 and 61 constitute second transporting means for transporting the document 2a along the transport path 18.

A document sensor 26 senses the document 2a on the second transport path 18 at a position short of the scanner section 17. A stamping mechanism 27 is located on the transport path 18 upstream of the discharging roller 60. The inner guide plate 8a and outer guide plate 8b form a intermediate transport path 30 having a substantially constant radius of curvature. The intermediate transport path 30 connect the first and second transport paths 14 and 18 which are parallel to each other in the up-and-down direction. A loop detector 70 is mounted on the inner guide plate 8a.

As shown in FIG. 6, a transporting mechanism includes a first drive motor for driving the first transporting means. A drive pulley 82 is mounted on the output shaft of the drive motor 91. A belt 83 is passed over the drive pulley 82 and a driven pulley 84. The driven pulley 84 is operatively connected to the transporting roller 44 in order to transmit the output torque of the drive motor 81 thereto. A gear 85 is connected to the transporting roller 44 by a shaft 85a. The rotation of the transporting roller 44 is transferred to the feeding roller 43 and separating roller 44 by gear trains 86 and 87, respectively. The rotation of the feeding roller 43 is transferred to the pick-up roller 41 by a gear train 88.

A second drive motor 91 drives the second transporting means. A drive pulley 92 is mounted on the output shaft of the drive motor 91. A belt 93 is passed over the drive pulley 92 and driven pulleys 94–96. The driven pulleys 94–96 are respectively connected to the rollers 51, 53 and 60 for transferring the output torque of the drive motor 91 thereto.

In operation, a controller, not shown, sends drive signals to the drive motors 81 and 91 in order to cause them to rotate. The rotation of the drive motor 81 is transferred to the driven pulley 84 via the drive pulley 82 and belt 83. The drive motor 91 causes the rollers 51, 53 and 60 to rotate in the forward direction. At this instant, the driven pulley 82 causes the pick-up roller 41 to rotate and feed one or more documents 2 to the nip between the feeding roller 43 and separating roller 42. The rotation of the gear 85 is transferred to the separating roller 42 via a torque limiter, not shown. Therefore, when only one document 2 is fed to the above nip by the pick-up roller 41, the separating roller 42 follows the rotation of the feeding roller 43 and cooperates with the roller 43 to convey the document 2 into the first transport path 14. When two or more documents 2 are fed to the nip by the pick-up roller 41, the separating roller 42 is rotated in the opposite direction to the feeding roller 43 so as to return the documents 2 underlying the uppermost document 2a to the table 1. Subsequently, the separating roller 42 again follows the rotation of the feeding roller 43 in order to convey only the uppermost document 2a into t h e transport path 14 in cooperation with the roller 43.

The transporting roller 44 and pressing roller 45 on the first transport path 14 and which nip the document 2a drive the document 2a into the intermediate transport path 30. The document 2a is conveyed along the outer guide plate 8b until its leading edge has been nipped by the transporting roller 51 and pressing roller 52. After the leading edge of the document 2a has been nipped by the rollers 51 and 52, the document 2a is continuously conveyed while being restricted at two positions where the rollers 44 and 45 and the rollers 51 and 52 are located. At this instant, the document 2a is bent with a radius of curvature intermediate between the radii of curvature of the outer guide plate 8b and inner guide plate 8a. Such conveyance of the document 2a continues until the trailing edge of the document 2a moves away from the rollers 44 and 45. The document sensor 26 senses the leading edge of the document 2a driven into the second transport path 18 by the rollers 51 and 52. Then, the document 2a is inserted between the scanner section 17 and the white reference plate 19.

The scanner section 17 is implemented by equimagnification optics or a CCD line image sensor by way of example. While the document 2a is conveyed at a preselected speed, the scanner section 17 scans the image surface of the document 2a at a period corresponding to a pixel density, thereby reading an image out of the image surface. The document 2a scanned by the scanner section 17 is sequentially driven along the transport path 18 by the transporting roller 53 and pressing roller 54, and then driven out onto the tray 63 by the discharging roller 60 and pressing roller 61.

Assume that the operator desires to print "DONE" or a similar label on the document 2a. Then, a stamp member, not shown, included in the stamping mechanism 27 is pressed against the document 2a scanned by the scanner section 17.

In the illustrative embodiment, the document transport speed must be precisely controlled to one corresponding to the pixel density of a reproduced image. In addition, control for interrupting and resuming the transport of the document 2a is required due to the limited capacity of a memory, not shown, used to temporarily store a line image signal. For these reasons, the drive motors 81 and 91 each is implemented as a stepping motor. The controller mentioned earlier drives the drive motors 81 and 91 with drive pulses of 3,500 pps or below. While the loop detector 70 is in its OFF state, the controller sends to the drive motors 81 and 91 reference drive pulses $P_{D1}$ which maintain a speed $V_1$ at which the rollers 42–45 transport the document 2a and a speed $V_2$ at which the rollers 51–54, 60 and 61 convey it equal to each other.

The construction and operation of the loop detector 70 will be described with reference to FIGS. 7A and 7B. FIGS. 7A and 7B respectively show a condition wherein the loop detector 70 is in its OFF state and a condition wherein it is in its ON state. The loop detector 70 is made up of a holder 71 affixed to the outer surface of the inner guide plate 8a, and a microswitch 72 received in the holder 71 and having a lever 72a and a push button 72b.

So long as the document 2a in the intermediate path 30 does not contact the inner guide plate 8a, the microswitch 72 remains in its OFF state with the lever 72a protruding from the guide surface of the guide 8a to a preselected distance. On the other hand, when the transport speed $V_2$ of the roller 51 becomes higher than the transport speed $V_1$ of the roller 44, the radius of curvature of the document 2a nipped by the rollers 44 and 45 and the rollers 51 and 52 at its trailing edge and leading edge, respectively, increases with the elapse of time. As soon as the radius of curvature of the document 2a exceeds the radius of curvature of the guide plate 8a by a preselected amount, the document 2a contacts the lever 72a. The tension of the document 2a contacting the lever 72a or the guide plate 8a sequentially increases. As a result, as shown in FIG. 7B, the lever 72a is moved to its ON position by the document 2a, pressing the push button 72b, i.e., turning on the microswitch 72. In response, the microswitch 72 sends a limit loop signal to a controller 62.

Figure 8:
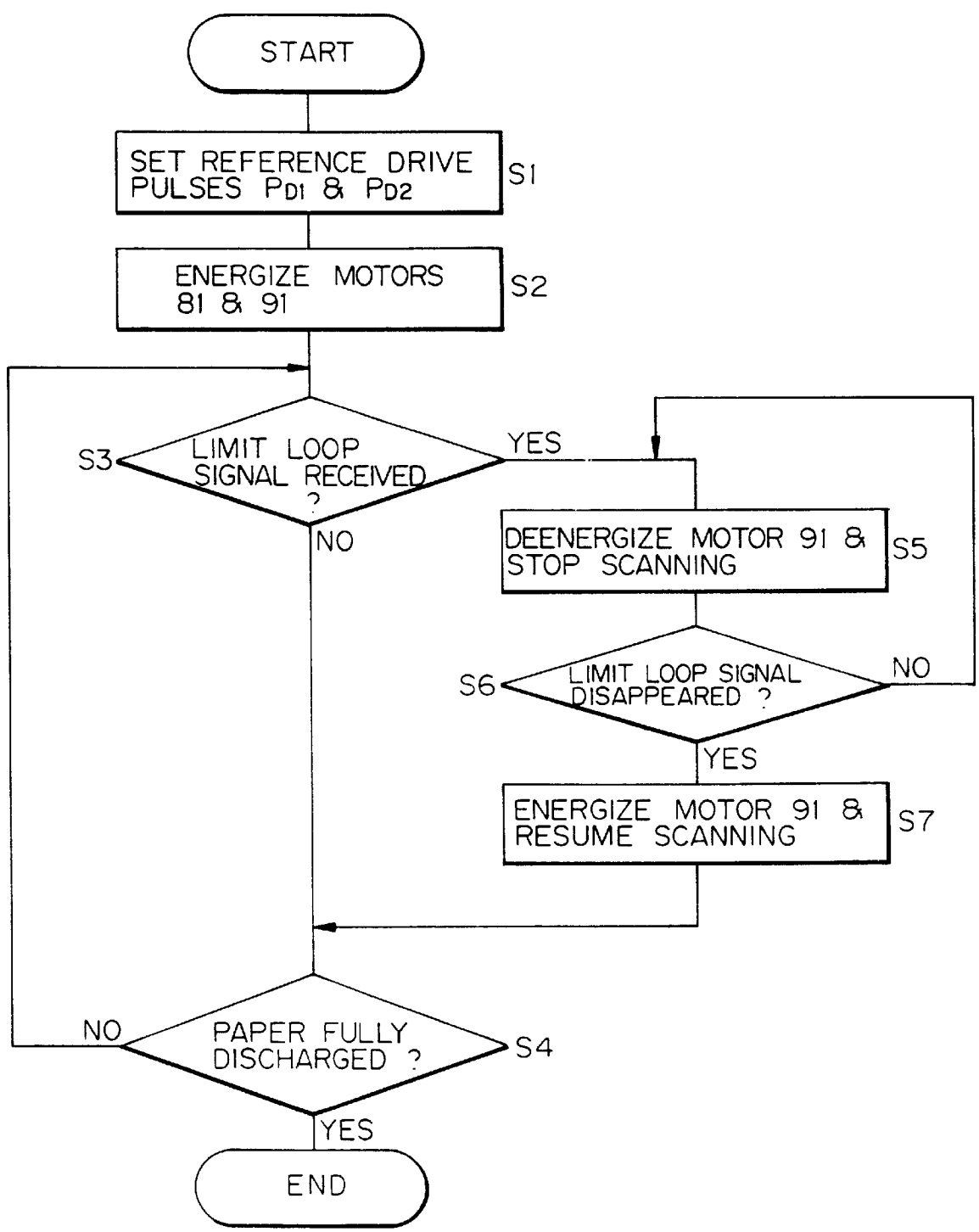
FIGS. 8–10 are flowcharts each showing a particular control routine available with a controller included in the third embodiment.
Figure 9:
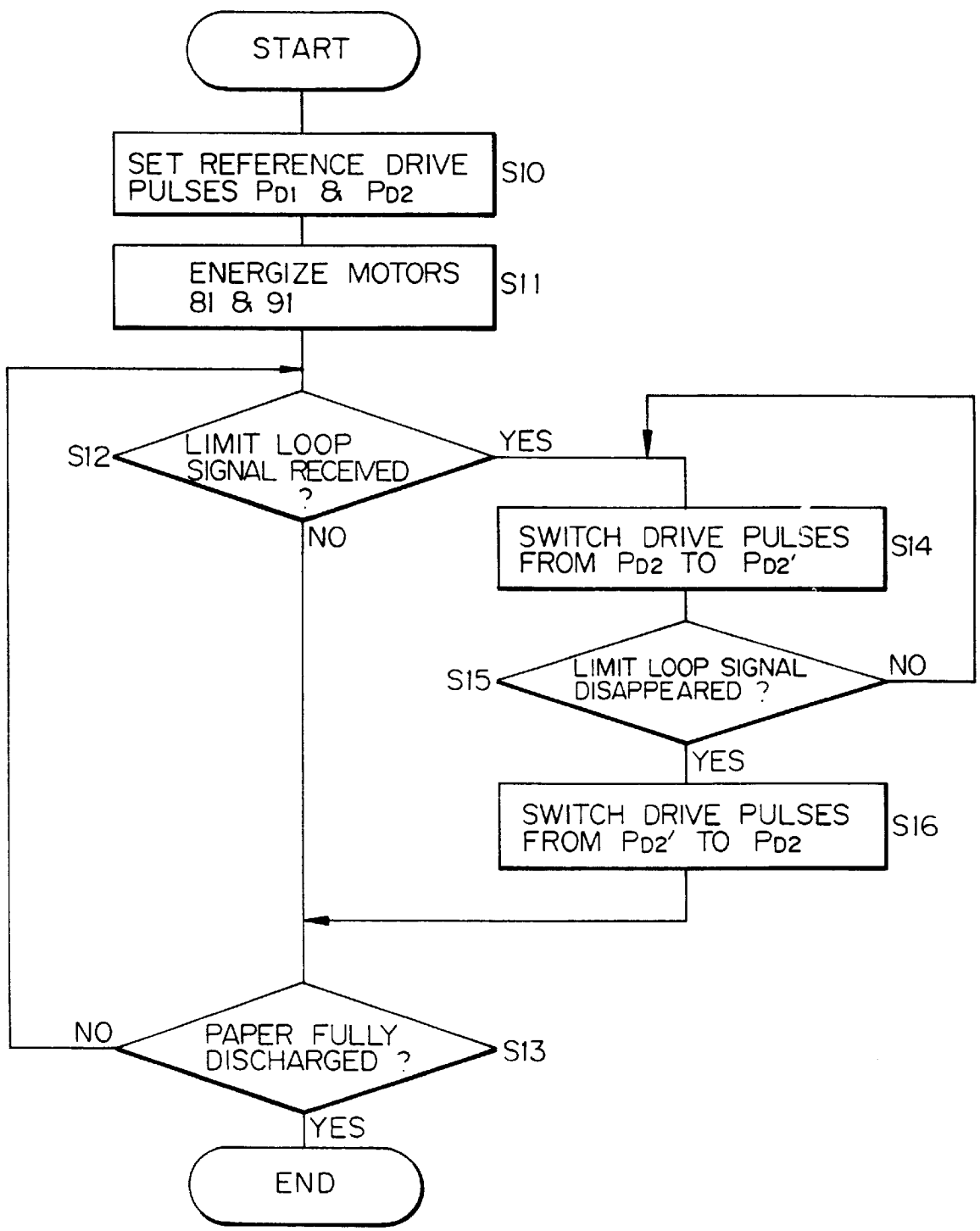
Figure 10:
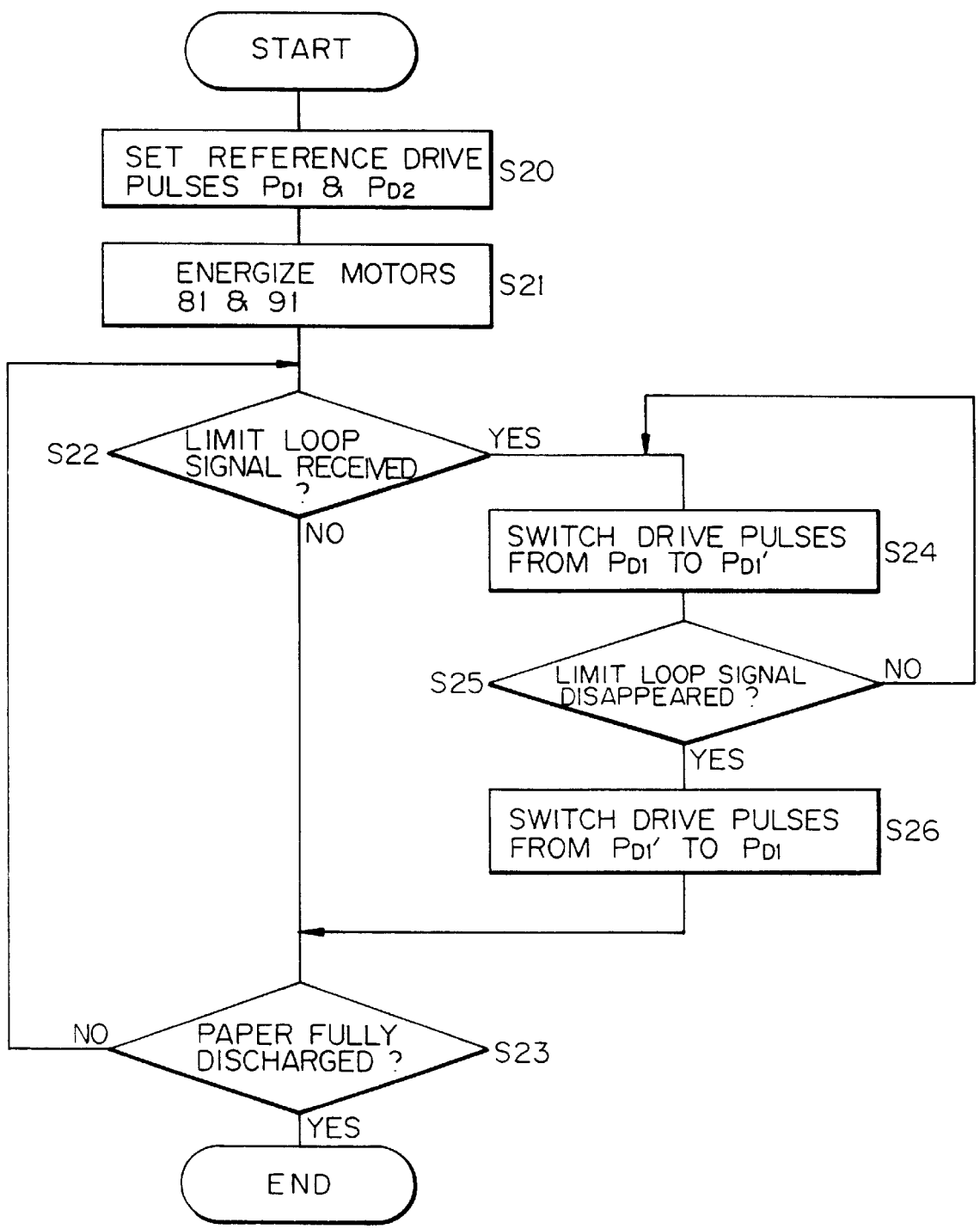

Referring to FIGS. 8–10, first to third motor control routines available with the illustrative embodiment will be described. In the first control routine shown in FIG. 8A, the controller 62 sets reference drive pulses $P_{D1}$ and $P_{D2}$ which make the transport speed $V_1$ of the rollers 42–45 and the transport speed $V_2$ of the rollers 51–54, 60 and 61 equal to each other (step S1). Then, the controller 62 drives the drive motors 81 and 91 by the reference drive pulses $P_{D1}$ and $P_{D2}$, respectively (step S2). Subsequently, the controller 62 determines whether or not it has received the limit loop signal from the microswitch 72 of the loop detector 70 (step S3). If the document 2a has been driven out without any limit loop signal input to the controller 62 (YES, step S4), the controller 62 ends the routine. If the limit loop signal is input to the controller 62 before the document 2a has been driven out (YES, step S3), the controller 62 stops driving the second drive motor 91 and interrupts the scanning of the document 2a (step S5). The controller 62 maintains this condition until the limit loop signal from the microswitch 72 disappears (NO, step S6). When the limit loop signal disappears (YES, step S6), the controller 62 again drives the second motor 91 and causes the scanning of the document 2a to be resumed (step S7). The controller 62 continuously executes the first control routine until the document 2a has been fully discharged (step S4).

In the second control routine shown in FIG. 9, the controller 62 again sets the reference drive pulses $P_{D1}$ and $P_{D2}$ which make the transport speed $V_1$ of the rollers 42–45 and the transport speed $V_2$ of the rollers 51–54, 60 and 61 equal to each other (step S10). Then, the controller 62 drives the drive motors 81 and 91 by the reference drive pulses $P_{D1}$ and $P_{D2}$, respectively (step S11). Subsequently, the controller 62 determines whether or not it has received the limit loop signal from the microswitch 72 of the loop detector 70 (step S12). If the document 2a has been driven out without any limit loop signal input to the controller 62 (YES, step S13), the controller 62 ends the routine. If the limit loop signal is input to the controller 62 before the document 2a is fully discharged (YES, step S12), the controller 62 replaces the reference drive pulses $P_{D2}$ assigned to the second drive motor 91 and having a reference frequency with drive pulses $P_{D2}'$ (step S14). The drive pulses $P_{D2}$ and $P_{D2}'$ have a relation of $P_{D2}'=P_{D2}-P_0$ where $P_0$ denotes the number of pulses corresponding to a preselected decrement of the transport speed $V_2$. As a result, the transport speed $V_2$ is lowered by the preselected amount, varying the speed ratio between the drive motors 81 and 91. The controller 62 maintains this condition until the limit loop signal output from t h e microswitch 72 disappears (NO, step S15). On the disappearance of the limit loop signal (YES, step S15), the controller 62 restores the drive pulses assigned to the drive motor 91 to its reference frequency $P_{D2}$ (step S16). The controller 62 continues the above routine until the document 2a has been fully discharged (step S13).

In the third control routine shown in FIG. 10, the controller 62 sets the reference drive pulses $P_{D1}$ and $P_{D2}$ which make the transport speed $V_1$ of the rollers 42–45 and the transport speed $V_2$ of the rollers 51–54, 60 and 61 equal to each other (step S20). Then, the controller 62 drives the drive motors 81 and 91 by the reference drive pulses $P_{D1}$ and $P_{D2}$, respectively (step S21). Subsequently, the controller 62 determines whether or not it has received the limit loop signal from the microswitch 72 of the loop detector 70 (step S22). If the document 2a has been driven out without any limit loop signal input to the controller 62 (YES, step S23), the controller 62 ends the routine. If the limit loop signal is input to the controller 62 before the document 2a is fully discharged (YES, step S22), the controller 62 replaces the reference drive pulses $P_{D1}$ assigned to the first drive motor 81 and having a reference frequency with drive pulses $P_{D1}'$ (step S24). The frequency of the drive pulses $P_{D1}'$ is higher than the frequency of the drive pulses $P_{D1}$. As a result, the transport speed $V_1$ is increased by a preselected amount, varying the speed ratio between the drive motors 81 and 91. The controller 62 maintains this condition until the limit loop signal output from the microswitch 72 disappears (NO, step S25). On the disappearance of the limit loop signal (YES, step S25), the controller 62 restores the drive pulses assigned to the drive motor 81 to its reference frequency $P_{D1}$ (step S26). The controller 62 continues the above routine until the document 2a has been fully discharged (step S23).

To detect an increase in the radius of curvature of the document 2a, the above embodiment causes the document 2a in the intermediate path 2a to actuate the microswitch 72 due to its tension. Alternatively, use may be made of a photointerrupter capable of detecting the document 2a optically or a gap sensor capable of detecting it magnetically by way of example.

A loop detector similar in configuration to the loop detector 70 may, of course, be provided on the outer guide plate 8b facing the inner guide plate 8a. In such an alternative case, the loop detector will detect a decrease in the radius of curvature which causes the document 23a to contact the outer guide plate 8b. The document 2a brought into contact with the outer guide plate 8b effects the reading speed little. However, it is preferable to deenergize the first drive motor 81 or lower its rotation speed in response to the limit loop signal output from the above loop detector. This successfully prevents the document 2a from creasing and prevents the image from being reduced in density due to friction between the document 2a and the guide plate 8b.

As stated above, the loop detector 70 detects an increase in the radius of curvature of the document 2a being conveyed along the intermediate transport path 30 with its opposite edges nipped by the rollers 44 and 45 and the rollers 51 and 52. When the radius of curvature of the document 2a reaches its limit defined by the path 30, as determined by the loop detector 70, the controller 62 varies the rotation speed of the first drive motor 81 or that of the second drive motor 91 such that the radius of curvature of the document 2a remains in the range defined by the path 30. Assume that the document 2a is pressed against the inner guide plate 8a due to an error in the drive pulses assigned to the drive motor 81 or 82, i.e., an error in the preselected rotation speed, or due to the reversal of the relation between the transport speeds $V_1$ and $V_2$ ascribable to, e.g., the wear of the roller 44 or 51. Even in such a condition, the radius of curvature of the document 2a remains in the range defined by the intermediate path 30. This prevents the loads acting on the drive motors 81 and 91 during the scanning of the document 2a from varying sharply. Therefore, the scanner section 17 is capable of surely scanning the document 2a every preselected pitch. It follows that image quality is free from deterioration ascribable to defective scanning, i.e., the variation of transport speed.

The controller 62 deenergizes the second drive motor 91 during the interval between the time when the loop detector 70 determines that the radius of curvature of the document 2a has reached its limit and the time when the radius of curvature is restored to the allowable range defined by the intermediate path 30. This allows the document 2a to restore its radius of curvature lying in the above range in a short period of time. Alternatively, the controller 62 lowers the rotation speed of the second motor and thereby varies the speed ratio between the two motors 81 and 91 during the above particular interval. This brings the radius of curvature of the document 2a into the above range without interrupting the scanning of the document 2a.

In summary, in accordance with the present invention, assume that the radius of curvature of a document reaches its limit defined by an intermediate transport path document when the transport speed of first transporting means and that of second transporting means do not coincide due to, e.g., an error in drive pulses fed to a first or a second drive motor. Even in such a condition, the radius of curvature of the document can be restored to one lying in the range defined by the intermediate transport path. This successfully obviates the variation of a load acting on the first or the second drive motor and ascribable to, e.g., the pressing contact of the document with the wall of the above path. Therefore, the transport speed of the second transporting means is protected from variation during the scanning of the document. It follows that a scanner is capable of surely scanning the document every preselected pitch, and image quality is free from deterioration ascribable to defective scanning, i.e., the variation of transport speed. In addition, the radius of curvature of the document can be brought into the above range without resorting to the interruption of scanning.

Obviously, numerous additional modifications and variations of the present invention are possible in light of the above teachings. It is therefore to be understood that within the scope of the appended claims, the present invention may be practiced otherwise than as specifically described herein.

The present application is based on Priority Documents including Japanese Patent Application Nos. 08-114397, 08-194164 and 08-183697 the entire contents of which are hereby incorporated by reference.

What is claimed is:

1. An image device for reading an image out of an original document, comprising:

a separating unit for separating a stack of original documents one by one;

a separating motor for driving said separating unit;

a reading unit for reading an image of the original document separated from the stack;

a reading motor for driving said reading unit;

a transport path for transporting the original documents between the separating unit and the reading unit;

a detector detecting a change in a radius of curvature of the original documents transported in the transport path; and a controller controlling at least one of the separating motor and the reading motor based on an output of the detector.

2. A device as claimed in claim 1, wherein said separating unit includes a first transporting roller driven by said separating motor while said reading unit includes a second transporting roller driven by said reading motor.

3. A device as claimed in claim 2, wherein said first transporting roller rotates at a first preselected speed higher than or equal to a second speed at which said second transporting roller rotates when the detector detects no change in the radius of curvature of the original documents transported in the transport path.

4. A device as claimed in claim 3, wherein said first transporting roller has a greater diameter than said second transporting roller.

5. A device as claimed in claim 4, wherein said separating motor and said reading motor operate at a same speed.

6. A device as claimed in claim 3, wherein said first speed is up to 1% higher than said second speed.

7. A device as claimed in claim 6, wherein said separating motor and said reading motor operate at a same speed.

8. A device as claimed in claim 1, wherein said separating unit includes a first transporting roller driven by said separating motor while said reading unit includes a platen roller facing a contact type sensor, said platen roller being driven by said reading motor.

9. A device as claimed in claim 8, wherein said first transporting roller rotates at a first speed higher than or equal to a second speed at which said platen roller rotates when the detector detects no change in the radius of curvature of the original documents transported in the transport path.

10. A device as claimed in claim 9, wherein said first speed is up to 1% higher than said second speed.

11. A device as claimed in claim 9, wherein said first transporting roller has a greater diameter than said platen roller.

12. A device as claimed in claim 11, wherein said first speed is up to 1% higher than said second speed.

13. A device as claimed in claim 11, wherein said separating motor and said reading motor operate at a same speed.

14. A device as claimed in claim 1, wherein the original document separated from the stack is turned over when transferred from said separating unit to said reading unit.

15. An imaging device for reading an image out of an original document, comprising:

separating means for separating a stack of original documents one by one;

separating motor means for driving said separating means;

reading means for reading an image of the original document separated from the stack;

reading motor means for driving said reading means;

transport means for transporting the original documents between the separating unit and the reading means;

detector means for detecting a change in a radius of curvature of the original documents transported in the transport means; and control means for controlling at least one of the separating motor means and the reading motor means based on an output of the detector means.

16. A device as claimed in claim 15, wherein said separating means includes first transporting means driven by said separating motor means while said reading means includes second transporting means driven by said reading motor means.

17. A device as claimed in claim 16, wherein said first transporting means rotates at a first preselected speed higher than or equal to a second speed at which said second transporting means rotates when the detector means detects no change in the radius of curvature of the original documents transported in the transport means.

18. A device as claimed in claim 17, wherein said first transporting means has a greater diameter than said second transporting means.

19. A device as claimed in claim 18, wherein said separating motor means and said reading motor means operate at a same speed.

20. A device as claimed in claim 18, wherein said separating motor means and said reading motor means operate at a same speed.

21. A device as claimed in claim 17, wherein said first speed is up to 1% higher than said second speed.

22. A device as claimed in claim 15, wherein said separating means includes first transporting means driven by said separating motor means while said reading means includes platen means facing contact type sensor means, said platen means being driven by said reading motor means.

23. A device as claimed in claim 22, wherein said first transporting means rotates at a first speed higher than or equal to a second speed at which said platen means rotates when the detector means detects no change in the radius of curvature of the original documents transported in the transport means.

24. A device as claimed in claim 23, wherein said first transporting means has a greater diameter than said platen means.

25. A device as claimed in claim 24, wherein said first speed is up to 1% higher than said second speed.

26. A device as claimed in claim 23, wherein said first speed is up to 1% higher than said second speed.

27. A device as claimed in claim 23, wherein said separating motor means and said reading motor means operate at a same speed.

28. A device as claimed in claim 15, wherein the original document separated from the stack is turned over when transferred from said separating means to said reading means.

29. An imaging device for reading an image out of an original document, comprising:

a first drive motor;

first transporting means arranged on a first transport path, for transporting the original document with a torque transferred from said first drive motor;

a second drive motor;

second transporting means arranged on a second transport path, for transporting the original document with a torque transferred from said second drive motor;

a curved intermediate transport path connecting said first transport path to said second transport path, for guiding the original document coming out of said first transport path to said second transport path;

reading means for scanning an image surface of the original document being conveyed along said second transport path by said second transporting means to thereby read an image;

loop detecting means for detecting a change in a radius of curvature of the original document, as measured in said intermediate transport path, being conveyed by said first transporting means at a trailing edge and by said second transporting means at a leading edge; and control means for varying, when said loop detecting means determines that the radius of curvature of the original document has reached a limit value defined by said intermediate transport path, a rotation speed of either said first drive motor or said second drive motor in order to confine said radius of curvature in a range defined by said intermediate transport path.

30. A device as claimed in claim 29, wherein said control means stops driving said second drive motor during an interval between a time when the radius of curvature of the original document reaches said limit value, as determined by said loop detecting means, and a time when said radius of curvature is restored to said range, as also determined by said loop detecting means.

31. A device as claimed in claim 29, wherein said control means varies a speed ratio between said first and second drive motors during an interval between a time when the radius of curvature of the original document reaches said limit value, as determined by said loop detecting means, and a time when said radius of curvature is restored to said range, as also determined by said loop detecting means.

* * * * *

UNITED STATES PATENT AND TRADEMARK OFFICE
CERTIFICATE OF CORRECTION

PATENT NO. : 6,005,687
DATED : December 21, 1999
INVENTOR(S) : Yasuhiro Kawashima et al.

It is certified that error appears in the above-identified patent and that said Letters Patent is hereby corrected as shown below:

On the title page, item [30] is incorrectly listed. The Foreign Application Priority Data should be:

--[30] Foreign Application Priority Data

Apr. 12, 1996 [JP] Japan............8-114387
Jul.  5, 1996 [JP] Japan............8-194164
Jul. 12, 1996 [JP] Japan........... 8-183697--

Signed and Sealed this

Nineteenth Day of June, 2001

*Attest:*

NICHOLAS P. GODICI
*Attesting Officer*    *Acting Director of the United States Patent and Trademark Office*